Patented July 25, 1939

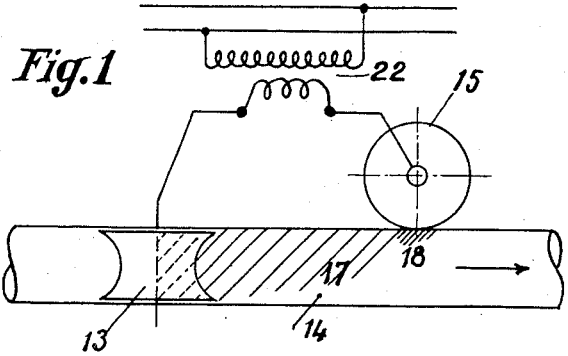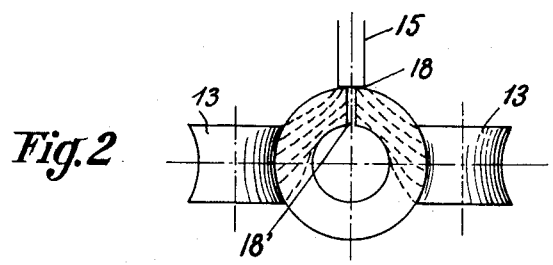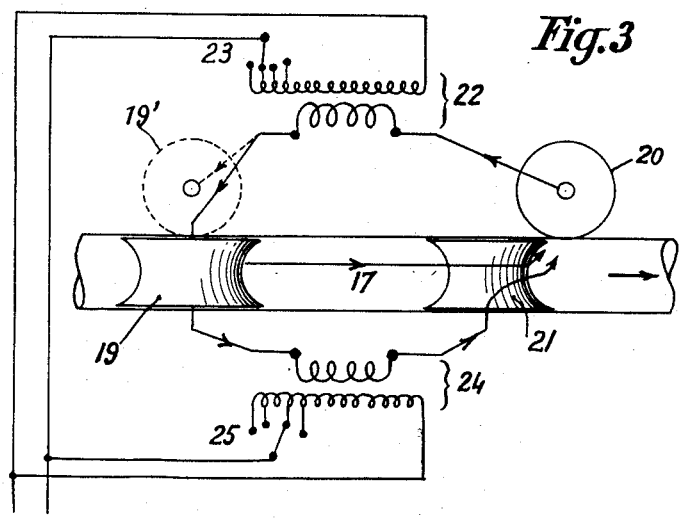

2,167,554

UNITED STATES PATENT OFFICE 2,167,554

PROCESS FOR THE ELECTRIC WELDING OF TUBES

David Sciaky, Paris, France

Application May 29, 1936, Serial No. 82,485
In France May 29, 1935

3 Claims. (Cl. 219—10)

My invention relates to a process for the electric welding of tubes.

One object of the present invention is to provide an improved process for the resistance welding of tubes in which use is made of roller electrodes contacting with the work to be welded, which is continuously moved forward.

More specifically, the object is to ensure the direct and also the indirect welding in one single operation.

A further object of the invention is to reduce to a minimum the expenditure of current used for the weld, and also to increase the speed at which the work is displaced during its passage over the welding electrodes, thus raising the output of the machine.

Another purpose is to exercise adequate control over the welding effected by the electrodes and so increase the quality of the weld.

The invention likewise aims at causing the metal to anneal during the welding operation itself and at the suppression of internal stresses. In view of this, the invention renders the treatment of the welded tubes in an annealing furnace superfluous and reduces to a minimum the necessity for normalising, thus lowering the price of the finished product.

A further object of the invention is to provide a tube welding process that is particularly flexible, that is, a process in which the current density may be varied within very wide limits, whereby increased current may be employed without risk of burning the tube.

Furthermore, the invention aims at the production of finished products having a smooth, polished appearance of a bluish colour owing to the avoidance of scale or black iron oxide coating, that is scorched metal, on the tube. The tube is therefore in the optimum condition to take on a highly adhesive layer of zinc.

The processes whereby the foregoing objects are realised have the features set forth in the following description and in the claims at the end of the said description.

The invention is illustrated, by way of example, in the accompanying drawing, wherein—

Figs. 1 and 2 are two diagrams showing the positions of the principal rollers relative to the tube in a side elevation and in a transverse section, respectively.

Fig. 3 is a diagrammatic side view of a device according to the present invention.

According to Figures 1 and 2, several rollers are arranged in parallel on the cold metal, so as to ensure good contact. The "up-stream" rollers (i. e., those by which the tube is first engaged) are preferably disposed laterally as indicated at 13 and are electrically connected to one of the terminals of the secondary of the main transformer 22, whereas the other terminal of this winding is connected to the down-stream roller 15. The up-stream roller electrodes are applied to the work piece outside of the gap region thereof and distributed circumferentially. If two up-stream rollers are used, they are arranged horizontally and opposite one another at the same place of the work piece. The gap is disposed in the upper portion of the work piece and the down-stream roller electrode 15 is applied to the gap; as a result, the electric current traverses the greater part of the section of the work piece and thus receives a preliminary heating.

The quantity of heat evolved under the side rollers 13 is comparatively small and there need be no fear of any fusion of the metal at this point; at the same time a whole tube at 17 is raised to the temperature corresponding to the limit of elasticity, thus obviating internal stresses and allowing the two lips or edges to be welded to approach each other readily. Only one roller 15 is arranged beyond the side rollers 13 in the direction in which the tube is moving; consequently the amount of heat released under this roller at 18 is comparatively great and sufficient to ensure an excellent contact between the two lips, while producing a suitable and uniform temperature in the metal at the exact welding spot.

Thus the localisation of the heating is effected perfectly and in as effective a manner as possible; there is no wasteful evolution of heat or expenditure of power, and the machine can function at a great speed and with a high degree of regularity.

From Fig. 2 it can be seen that the lines of force of the electric flux converge following the shortest paths between the narrow contact surface of the roller 15 and the contacts of the lateral rollers 13, thereby traversing the greater part of the tube section. Consequently the entire body of the work piece is heated and softened before the welding proper. Moreover, the flux traverses the entire cross section of the tube to be welded at the open edges thereof from 18' to 18, whereby perfect welding is insured throughout the thickness of the tube.

According to the present invention, as illustrated in Fig. 3, the foregoing process is still further improved by introducing a side pressure-roller 21 having a certain difference of potential relative to the welding roller 20.

As in the case of Fig. 1, there are two "upstream" side rollers 19, the main welding transformer 22 and the single roller 20 mounted beyond the rollers 19. An extra roller 19' electrically connected with rollers 19 may be provided as shown in dotted outline.

The pressure rollers 21 are connected to one terminal of the secondary winding of a transformer 24, the opposite terminal of which is connected with the rollers 19 and with roller 19', if provided.

The primary winding of transformer 24 is provided with a tapping switch 25 and when the switch 25 is adjusted to a dead stud, no current flows through the primary and the secondary circuit of the transformer 24. The current delivered by the transformer 22 flows entirely through the tube between the rollers 19 and 20 as a matter of fact, the impedance, which is opposed by this part of the tube, is insignificant as compared with the impedance of the shunt connection formed by the secondary of the auxiliary transformer 24 whose primary circuit is interrupted.

If, on the other hand, the switch 25 of the transformer 24 is so adjusted as to cause a current to flow as indicated by the arrows and to regulate the intensity of this current, then the intensity of the current passing through the tube from 19 to 21 is reduced, and that of the current flowing from 21 to 20 is increased. This gives rise to a less intense heating of the tube section between 19 and 21, but, at the same time, a more intense heating of the metal at the exact spot where the weld has to be made.

Assuming that the output of transformer 22 can be regulated with the aid of a switch 23, there is thus provided a regulating means that is independent of the heating of the tube, as well as, and of the heating of the gap at the exact spot where the weld has to be effected, a result that cannot be obtained with any of the known systems.

What I claim as my invention and desire to secure by Letters Patent is:

1. A welding process for producing a closed tube from a work piece having a longitudinal gap therein by means of an electric current source comprising two poles, which process consists of displacing the work piece in a continuous translatory movement, applying to the up-stream side of the work piece and outside of the gap region thereof, roller electrodes distributed circumferentially with respect to the work piece and connected to one of the poles, applying, from the down-stream side to the gap of the work piece a single roller electrode connected to the other pole, placing supplementary control rollers in electric contact with the work piece between the up-stream electrodes and the down-stream electrode, said supplementary rollers serving for the control of the amount of heat liberated and being raised to varying potentials in relation to the up-stream roller electrodes and the down-stream roller electrode.

2. A welding process for producing a closed tube from a work piece having a longitudinal gap therein by means of an electric current source comprising two poles, which process consists of displacing the work piece in a continuous translatory movement, applying to the up-stream side of the work piece and outside of the gap region thereof, roller electrodes distributed circumferentially with respect to the work piece and connected to one of the poles, applying to the gap of the work piece from the down-stream side, a single roller electrode connected to the other pole, placing supplementary control rollers in electric contact with the work piece between the up-stream electrodes and the down-stream electrode, said supplementary rollers serving for the control of the amount of heat liberated, connecting said supplementary rollers to the poles of the source of current, and regulating the amount of current passing through said secondary roller, whereby the proportion of the amounts of heat liberated at the points of contact of the up-stream roller electrodes and the down-stream roller electrode, respectively, may be controlled.

3. A welding process for producing a closed tube from a work piece having a longitudinal gap therein by means of an electric current source, comprising two poles, which process consists of displacing the work piece in a continuous translatory movement, applying to the up-stream side of the work piece and outside of the gap region thereof roller electrodes distributed circumferentially with respect to the work piece and connected to one of the said poles, applying to the gap of the work piece from the down-stream side a single roller electrode connected to the other pole, and a supplementary heat distributing roller having a variable potential with respect to that of the down-stream roller electrode.

DAVID SCIAKY.